(12) United States Patent
Nakajima et al.

(10) Patent No.: US 11,388,038 B2
(45) Date of Patent: Jul. 12, 2022

(54) OPERATION DEVICE AND OPERATION METHOD

(71) Applicant: Nippon Telegraph and Telephone Corporation, Tokyo (JP)

(72) Inventors: Motomu Nakajima, Tokyo (JP); Yuji Soejima, Tokyo (JP); Aiko Oi, Tokyo (JP); Kosuke Sakata, Tokyo (JP); Yuichi Suto, Tokyo (JP); Shingo Horiuchi, Tokyo (JP); Masataka Sato, Tokyo (JP); Kimihiko Fukami, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 16/965,824

(22) PCT Filed: Feb. 6, 2019

(86) PCT No.: PCT/JP2019/004157
§ 371 (c)(1),
(2) Date: Jul. 29, 2020

(87) PCT Pub. No.: WO2019/156102
PCT Pub. Date: Aug. 15, 2019

(65) Prior Publication Data
US 2021/0051056 A1 Feb. 18, 2021

(30) Foreign Application Priority Data
Feb. 8, 2018 (JP) .............................. JP2018-021285

(51) Int. Cl.
*H04L 12/24* (2006.01)
*H04L 12/26* (2006.01)
(Continued)

(52) U.S. Cl.
CPC ........ *H04L 41/0631* (2013.01); *H04L 41/069* (2013.01); *H04L 41/0677* (2013.01);
(Continued)

(58) Field of Classification Search
CPC ............. H04L 41/0631; H04L 41/0677; H04L 41/069; H04L 41/0816; H04L 41/5009; H04L 43/0817
(Continued)

(56) References Cited

U.S. PATENT DOCUMENTS

2002/0194328 A1* 12/2002 Hallenbeck .......... G04G 13/021
709/224
2016/0205004 A1* 7/2016 Chou .................. H04L 41/0896
709/224

(Continued)

FOREIGN PATENT DOCUMENTS

| JP | 2004236030 | 8/2004 |
|----|-----------|--------|
| JP | 2017143366 | 8/2017 |

(Continued)

OTHER PUBLICATIONS

Kuzniar et al., "Automatic Failure Recovery for Software-Defined Networks." Proceedings of the Second ACM SIGCOMM Workshop on Hot Topics in Software Defined Networking, Aug. 16, 2013, pp. 159-160.

*Primary Examiner* — Schquita D Goodwin
(74) *Attorney, Agent, or Firm* — Fish & Richardson P.C.

(57) ABSTRACT

An operation apparatus for outputting a request to a management apparatus which manages a Network Service (NS) constructed on a NetWork (NW) including a core NW serving as a virtualization area and an access NW serving as a non-virtualization area including: a storage unit configured to store new configuration information obtained by updating NW configuration information indicating an NW configu- (Continued)

ration including devices disposed on the NW due to a fault of the NS, a catalog which is a template of the NS, a record describing a lifecycle of the NS, and an order for requesting the management apparatus to control the NS; an optimal configuration determination unit configured to determine an optimal configuration of the NS based on the new configuration information, the catalog, the record, and the order; and an order generation unit configured to generate a change order for changing an NS configuration of the NS to the optimal configuration determined by the optimal configuration determination unit.

7 Claims, 5 Drawing Sheets

(51) Int. Cl.
| | |
|---|---|
| *H04L 41/0631* | (2022.01) |
| *H04L 41/0677* | (2022.01) |
| *H04L 41/069* | (2022.01) |
| *H04L 41/0816* | (2022.01) |
| *H04L 41/5009* | (2022.01) |
| *H04L 43/0817* | (2022.01) |

(52) U.S. Cl.
CPC ...... *H04L 41/0816* (2013.01); *H04L 41/5009* (2013.01); *H04L 43/0817* (2013.01)

(58) Field of Classification Search
USPC .......................................................... 709/224
See application file for complete search history.

(56) References Cited

U.S. PATENT DOCUMENTS

| | | | |
|---|---|---|---|
| 2018/0091395 A1* | 3/2018 | Shinohara | G06F 9/45558 |
| 2018/0262410 A1* | 9/2018 | Chou | H04L 41/5009 |
| 2019/0089780 A1* | 3/2019 | Yousaf | G06F 9/45533 |
| 2019/0132211 A1* | 5/2019 | Yeung | H04L 41/0816 |
| 2019/0215239 A1* | 7/2019 | Li | G06F 8/71 |
| 2019/0266514 A1* | 8/2019 | Akella | G06Q 10/0633 |
| 2019/0327621 A1* | 10/2019 | Chou | H04W 24/02 |
| 2020/0076709 A1* | 3/2020 | Stenberg | H04W 24/02 |

FOREIGN PATENT DOCUMENTS

| | | |
|---|---|---|
| JP | 2017143452 | 8/2017 |
| WO | WO 2016/157864 | 10/2016 |

* cited by examiner

OPERATION DEVICE AND OPERATION METHOD

CROSS-REFERENCE TO RELATED APPLICATIONS

This application is a National Stage application under 35 U.S.C. § 371 of International Application No. PCT/JP2019/004157, having an International Filing Date of Feb. 6, 2019, which claims priority to Japanese Application Serial No. 2018-021285, filed on Feb. 8, 2018. The disclosure of the prior application is considered part of the disclosure of this application, and is incorporated in its entirety into this application

TECHNICAL FIELD

The present disclosure relates to an operation apparatus and an operation method. Herein, "NW" is used as a term representing a network, and "NS" is used as a term representing a network service.

BACKGROUND ART

PTL 1 discloses a "management apparatus that manages a Network Service (NS) constructed on a NetWork (NW) including a core NW serving as a virtualization area and an access NW serving as a non-virtualization area. The management apparatus includes a service management unit that manages the NS, a server-side apparatus management unit that manages server-side apparatuses disposed on the NW, and an NW-side apparatus management unit that manages NW-side apparatuses disposed on the NW. The service management unit includes a request receiving unit that acquires, from the outside, an NS generation request including input parameters required for designating the server-side apparatuses and the NW-side apparatuses when the NS is provided, a catalog management unit that manages a catalog serving as a template of the NS, a resource adjustment unit that adjusts resources of the server-side apparatuses and resources of the NW-side apparatuses, a workflow unit that generates, in a case where the catalog is selected, a slice for realizing the NS by generating the resources of the designated server-side apparatuses and the resources of the designated NW-side apparatuses according to the input parameters, and an NS lifecycle management unit that manages a lifecycle of the NS.

CITATION LIST

Patent Literature

PTL 1: JP 2017-143452 A

SUMMARY OF THE INVENTION

Technical Problem

The invention described in PTL 1 is an invention of an orchestrator-based architecture for executing generating of an NS, updating of the NS, deleting of the NS, and the like. According to the invention described in PTL 1, generating of the NS or the like is performed according to a request from a host apparatus. However, in the management apparatus, for example, determination of control necessity, such as generating of the NS, and determination of a control target (such as the NW apparatus) are performed by an operator (a maintenance person) himself/herself. That is, in maintenance/operation of the NS, manual handling is required to a greater or lesser degree, and as a result, a maintenance/operation cost of the NS is significantly increased. The NW on which the NS is constructed is large enough to be over a Layer 2 (L2) and a Layer 3 (L3), and thus monitoring of the NS should be constantly performed. Based on these facts, the invention described in PTL 1 has room for improvement in maintenance/operation cost of the NS.

The present disclosure has been made in consideration of the above-described problems, and an object of the present disclosure is to reduce a maintenance/operation cost of a network service.

Means for Solving the Problem

In order to solve the above problems, according to claim 1 of the present disclosure, there is provided an operation apparatus for outputting a request to a management apparatus which manages a Network Service (NS) constructed on a NetWork (NW) including a core NW serving as a virtualization area and an access NW serving as a non-virtualization area, the operation apparatus including: a storage unit configured to store new configuration information obtained by updating NW configuration information indicating an NW configuration including devices disposed on the NW due to a fault of the NS, a catalog which is a template of the NS, a record describing a lifecycle of the NS, and an order for requesting the management apparatus to control the NS; an optimal configuration determination unit configured to determine an optimal configuration of the NS based on the new configuration information, the catalog, the record, and the order; and an order generation unit configured to generate a change order for changing an NS configuration of the NS to the optimal configuration determined by the optimal configuration determination unit.

Further, according to claim 7 of the present disclosure, there is provided an operation method of an operation apparatus for outputting a request to a management apparatus which manages a Network Service (NS) constructed on a NetWork (NW) including a core NW serving as a virtualization area and an access NW serving as a non-virtualization area, the operation method including: storing, in a storage unit of the operation apparatus, new configuration information obtained by updating NW configuration information indicating an NW configuration including devices disposed on the NW due to a fault of the NS, a catalog which is a template of the NS, a record describing a lifecycle of the NS, and an order for requesting the management apparatus to control the NS; determining an optimal configuration of the NS based on the new configuration information, the catalog, the record, and the order by the operation apparatus; and generating a change order for changing an NS configuration of the NS to the determined optimal configuration by the operation apparatus.

According to claims 1 and 7 of the present disclosure, determination of the NS optimal configuration is automated, and thus a maintenance burden of an operator is reduced. Therefore, a maintenance/operation cost of the network service can be reduced.

Further, according to claim 2 of the present disclosure, in the operation apparatus according to claim 1, the storage unit further stores alarm information indicating an occurrence of the fault of the NS and performance information indicating a specification of the devices disposed on the NW, and the operation apparatus further includes an abnormality detection unit configured to detect an abnormality based on the alarm information and the performance information.

According to claim 2 of the present disclosure, abnormality detection of the NS is also automated, and thus the maintenance burden of the operator is further reduced. Accordingly, the maintenance/operation cost of the network service can be further reduced.

Further, according to claim 3 of the present disclosure, the operation apparatus according to claim 2 further includes: a control determination unit configured to determine control necessity and a control target of a control by the management apparatus in response to the abnormality detection; and an NW configuration information updating unit configured to update the NW configuration information to the new configuration information.

According to claim 3 of the present disclosure, NW configuration information updating (new configuration information generation) is also automated, and thus the maintenance burden of the operator is further reduced. Accordingly, the maintenance/operation cost of the network service can be further reduced.
Further, the present disclosure can be performed without an intervention of the operator, and thus a closed-loop NS control by the management apparatus can be realized.

Further, according to claim 4 of the present disclosure, in the operation apparatus according to claim 1, the storage unit further stores alarm information indicating an occurrence of the fault of the NS and performance information indicating a specification of the devices disposed on the NW, and the operation apparatus further includes a fault location estimation unit configured to estimate a fault location based on the alarm information and the performance information, and a quality degradation factor identification unit configured to identify a quality degradation factor based on the alarm information and the performance information.

According to claim 4 of the present disclosure, fault location estimation and quality degradation factor identification are also automated, and thus the maintenance burden of the operator is further reduced. Accordingly, the maintenance/operation cost of the network service can be further reduced.

Further, according to claim 5 of the present disclosure, the operation apparatus according to claim 4 further includes: a control determination unit configured to determine control necessity and a control target of a control by the management apparatus in response to estimation of the fault location or identification of the quality degradation factor; and an NW configuration information updating unit configured to update the NW configuration information to the new configuration information in which the estimated fault location is removed or the new configuration information in which the identified quality degradation factor is removed.

According to claim 5 of the present disclosure, NW configuration information updating (new configuration information generation) is also automated, and thus the maintenance burden of the operator is further reduced. Accordingly, the maintenance/operation cost of the network service can be further reduced. Further, the present disclosure can be performed without an intervention of the operator, and thus a closed-loop NS control by the management apparatus can be realized.

Further, according to claim 6 of the present disclosure, in the operation apparatus according to claim 3 or 5, a function unit used for determination by the control determination unit is provided so as to be addable.

According to claim 6 of the present disclosure, it is possible to expand an algorithm used for control necessity determination and control target determination of the control determination unit.

Effects of the Invention

According to the present disclosure, the maintenance/operation cost of the network service can be reduced.

DESCRIPTION OF EMBODIMENTS

Hereinafter, an embodiment for realizing the present disclosure (hereinafter, referred to as a "present embodiment") will be described with reference to the drawings.
The present embodiment is a form of a closed-loop architecture for realizing, in a case where a fault occurs in a device disposed on the NW on which the NS is constructed, automation of corresponding subsequent management for maintenance/operation of the NS.

Configuration

Figure 1:
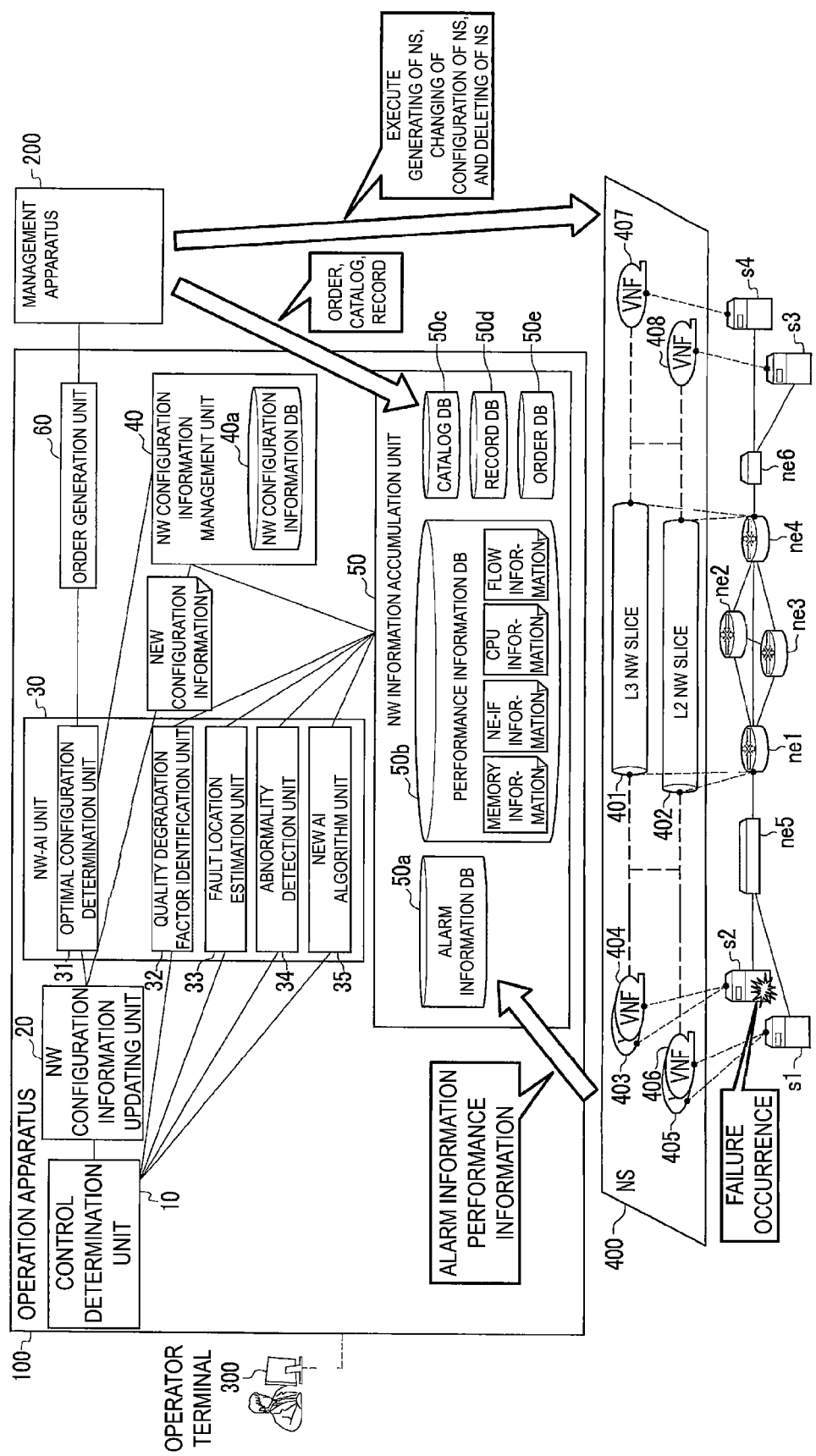
FIG. 1 is a functional configuration diagram of a system including an operation apparatus according to the present embodiment.

As illustrated in FIG. 1, a system including an operation apparatus 100 according to the present embodiment includes a management apparatus 200 and an operator terminal 300 in addition to the operation apparatus 100. In FIG. 1, an NS 400 is an NS as a maintenance/operation target. For convenience of explanation, the NS 400 is represented as "NS" without reference unless otherwise stated.

Operation Apparatus 100

The operation apparatus 100 is a computing device that outputs a request related to maintenance/operation of the NS to the management apparatus 200. The operation apparatus 100 functions as a host apparatus of the management apparatus 200. The operation apparatus 100 may be embodied as, for example, an Operation Support System (OSS) or a Business Support System (BSS).

The operation apparatus 100 includes hardware such as an input/output unit, a processing unit, and a storage unit. A CPU as a specific example of the processing unit executes a program read in a memory as a specific example of the storage unit, and thus a method according to the present embodiment is realized.

Details of the functional configuration of the operation apparatus 100 will be described below.

Management Apparatus 200

The management apparatus 200 is an apparatus that manages the NS. Further, the management apparatus 200 manages an NW on which the NS is constructed. The management apparatus 200 corresponds to the management apparatus described in PTL 1. Thus, a detailed description of the management apparatus 200 is omitted.

Operator Terminal 300

The operator terminal 300 is a console that is operated by a maintenance person (operator) of the NS. The operator terminal 300 can input predetermined information related to maintenance/operation of the NS 400 (details will be described below) into the operation apparatus 100. Further, the operator terminal 300 can display an output result of the operation apparatus 100.

The NW managed by the management apparatus 200 includes a core NW serving as a virtualization area and an access NW serving as a non-virtualization area. The core NW corresponds to an L3 NW. The access NW corresponds to an L2 NW. The management apparatus M can monitor devices disposed on the core NW and devices disposed on the access NW by collecting various information from the devices disposed on the core NW and the devices disposed on the access NW.

In FIG. 1, as a specific example of "the devices disposed on the core NW", Network Element (NE) apparatuses ne1 to ne6 are illustrated. In addition, in FIG. 1, as a specific example of "the devices disposed on the access NW", servers s1 to s4 are illustrated. An NW configuration is created by the devices disposed on the core NW and the devices disposed on the access NW. The servers s1 to s4 are apparatuses that execute the NS. The NE apparatuses ne1 to ne6 are apparatuses that transmit data for executing the NS.

The NS managed by the management apparatus 200 is an NS that can realize End-to-End (E2E) management. That is, the management apparatus 200 can manage a terminal of an NS use side (user), and manage a service provider (e.g., an Internet Service Provider (ISP) provider) via the devices on the access NW and the devices on the core NW that are maintained by an NS providing side (e.g., a communication provider).

In FIG. 1, as components of the NS 400, an L3 NW slice 401, an L2 NW slice 402, and Virtual Network Functions (VNF) 403 to 408 are illustrated. In other words, the NS configuration of the NS 400 includes the L3 NW slice 401, the L2 NW slice 402, and the VNF 403 to 408.

The L3 NW slice 401 is an NS part constructed on the L3 NW of the NS 400. The L2 NW slice 402 is an NS part constructed on the L2 NW of the NS 400. The slice is a virtualized NW of a part of the existing NW. The VNF 403 to 408 configure an application that is installed on a Virtual Machine (VM) generated by the servers s1 to s4.

The management apparatus 200 can generate the NS 400 for the servers s1 to s4 and the NE apparatuses ne1 to ne6. In addition, the management apparatus 200 can change (update) the configuration of the NS 400. The changing of the configuration of the NS 400 includes replacing of at least one of the VNF 403 to 408 with another VNF, replacing of at least one of the servers s1 to s4 with another server, replacing of at least one of the NE apparatuses ne1 to ne6 with another NE apparatus, and changing of the NW configuration. On the other hand, the changing of the configuration of the NS 400 is not limited thereto. Further, the management apparatus 200 can delete the NS 400.

Details of Configuration of Operation Apparatus 100

As illustrated in FIG. 1, the operation apparatus 100 includes function units of a control determination unit 10, an NW configuration information updating unit 20, an NW-Artificial Intelligence (AI) unit 30, an NW configuration information management unit 40, an NW information accumulation unit 50, and an order generation unit 60. The NW configuration information management unit 40 and the NW information accumulation unit 50 are function units embodying the storage unit of the operation apparatus 100.

Control Determination Unit 10

In a case where a fault occurs in the NS, the control determination unit 10 determines whether or not a control by the management apparatus 200 is necessary (control necessity). As an example of the fault of the NS, a failure of the server s2 (refer to FIG. 1), which is one of the devices disposed on the NW on which the NS is constructed, will be described. The "control by the management apparatus 200" specifically includes generating of the NS, changing of the configuration of the NS, and deleting of the NS.

Further, the control determination unit 10 determines a target (control target) of the control by the management apparatus 200. In the example of the present embodiment, the control target is the server s2. The determination of the control determination unit 10 is performed based on an analysis result of the NW-AI unit 30.

NW Configuration Information Updating Unit 20

The NW configuration information updating unit 20 updates NW configuration information indicating the NW configuration including a group of the devices disposed on the NW on which the NS is constructed. For example, in a case of a failure of the server s2, the NW configuration information updating unit 20 can generate NW configuration information indicating the NW configuration excluding the server s2. Further, the NW configuration information updating unit 20 outputs the updated NW configuration information to the NW configuration information management unit 40, as new configuration information (FIG. 1).

NW-AI Unit 30

The NW-AI unit 30 analyzes the fault of the NS. As illustrated in FIG. 1, the NW-AI unit 30 includes an optimal configuration determination unit 31, a quality degradation factor identification unit 32, a fault location estimation unit 33, an abnormality detection unit 34, and a new AI algorithm unit 35.

Optimal Configuration Determination Unit 31

The optimal configuration determination unit 31 determines an optimal NS configuration (an optimal configuration of the NS) according to the fault of the NS. The optimal NS configuration is determined based on, for example, the updated NW configuration information, which is stored in the NW configuration information management unit 40, and a catalog, a record, and an order (details will be described below) in NW information stored in the NW information accumulation unit 50. Further, the optimal configuration determination unit 31 starts processing according to an instruction from the NW configuration information updating unit 20.

Quality Degradation Factor Identification Unit 32

The quality degradation factor identification unit 32 identifies a factor of the fault of the NS, as a quality degradation factor. For example, the quality degradation factor is identified based on alarm information and performance information related to the fault in the NW information stored in the NW information accumulation unit 50. In a case where the quality degradation factor is identified, the NW configuration information updating unit 20 can generate new configuration information in which the quality degradation factor is removed (removable).

Fault Location Estimation Unit 33

The fault location estimation unit 33 estimates a location at which the fault of the NS is caused, as a fault location. For example, the fault location is estimated based on the alarm information and the performance information related to the fault in the NW information stored in the NW information accumulation unit 50. In a case where the fault location is estimated, the NW configuration information updating unit 20 can generate new configuration information in which the fault location is removed (removable).

Abnormality Detection Unit 34

The abnormality detection unit 34 detects an abnormality related to the fault of the NS by, for example, deep learning. For example, the abnormality is detected based on the alarm information and the performance information related to the fault in the NW information stored in the NW information accumulation unit 50.

New AI Algorithm Unit 35

The new AI algorithm unit 35 is an additional function unit used for the determination of the control determination unit 10 in addition to the quality degradation factor identification unit 32, the fault location estimation unit 33, and the abnormality detection unit 34. The new AI algorithm unit 35 is added, and thus an algorithm used for the determination of the control determination unit 10 can be expanded. According to an aspect of the maintenance/operation of the NS, in the NW-AI unit 30, one or more new AI algorithm units 35 may be provided or may not be provided.

NW Configuration Information Management Unit 40

The NW configuration information management unit 40 manages the NW configuration information indicating the NW configuration. The NW configuration information management unit 40 includes an NW configuration information DataBase (DB) 40a. The NW configuration information DB 40a registers a history of the NW configuration information over a predetermined period (e.g., a period from the start of the operation of the NS to the current time). In addition, the NW configuration information management unit 40 registers the updated NW configuration information, which is acquired from the NW configuration information updating unit 20, in the NW configuration information DB 40a. Further, when the optimal configuration is determined by the optimal configuration determination unit 31, the NW configuration information management unit 40 converts the updated NW configuration information and the catalog, the record, and the order in the NW information acquired from the NW information accumulation unit 50 into a predetermined format required for the optimal configuration determination, and the converted NW configuration information and the converted catalog, record, and order to the optimal configuration determination unit 31.

NW Information Accumulation Unit 50

The NW information accumulation unit 50 accumulates information related to the NW on which the NS is constructed, as NW information. The NW information can be classified into the alarm information, the performance information, the catalog, the record, and the order, and is not limited thereto. Further, the NW information accumulation unit 50 includes an alarm information DB 50a, a performance information DB 50b, a catalog DB 50c, a record DB 50d, and an order DB 50e.

The alarm information is information indicating an occurrence of the fault of the NS on the NW. The alarm information DB 50a registers a history of the alarm information over a predetermined period. The operation apparatus 100 or the operator terminal 300 can continuously collect the alarm information from the NS at a predetermined timing.

The performance information is information indicating a specification of each of the devices disposed on the NW. As illustrated in FIG. 1, the performance information can be classified into memory information, NW-InterFace (IF) information, CPU information, and flow information, and is not limited thereto. The memory information is information indicating a memory capacity of each of the devices disposed on the NW. The NW-IF information is information indicating an IF provided in each of the devices disposed on the NW. The CPU information is information indicating a CPU frequency of each of the devices disposed on the NW. The flow information is information indicating a flow that flows into each of the devices disposed on the NW or flows out of each of the devices disposed on the NW. The performance information DB 50b registers the performance information for each of the devices disposed on the NW. The operation apparatus 100 or the operator terminal 300 can continuously collect the performance information from the NS at a predetermined timing.

The catalog is a template of the NS. Details of the catalog are described in, for example, PTL 1, and thus a description thereof is omitted. The management apparatus 200 manages the catalog, and the operation apparatus 100 can acquire the catalog from the management apparatus 200. The catalog DB 50c registers a history of the catalog, which is used for the NS, over a predetermined period.

The record is information describing a lifecycle of the NS. Details of the record are described in, for example, PTL 1, and thus a description thereof is omitted. Further, the lifecycle of the NS is, for example, processes are from generating of the NS, changing of the configuration of the NS, to deleting of the NS. Details of the lifecycle of the NS are described in, for example, PTL 1, and a description thereof is omitted. The management apparatus 200 manages the record, and the operation apparatus 100 can acquire the record from the management apparatus 200. The record DB 50d registers a history of the record, which is used for the NS, over a predetermined period.

The order is request information for generating of the NS, changing of the configuration of the NS, or deleting of the NS, and is information indicating an operation request of the lifecycle of the NS. The order includes, for the target NS, a catalog selected by the maintenance person or the optimal configuration determination unit 31, a type of the operation request of the lifecycle of the NS, and an input parameter. The input parameter is designating information which designates the device on the NW and in which a logical path used to provide the target NS is set. Details of the input parameter are described in, for example, PTL 1, and a description thereof is omitted. The management apparatus 200 manages the order, and the operation apparatus 100 can acquire the order from the management apparatus 200. The order DB 50e registers a history of the order, which is used for the NS, over a predetermined period.

Order Generation Unit 60

The order generation unit 60 generates an order for changing the current NS to the optimal NS configuration determined by the optimal configuration determination unit 31. The order generation unit 60 transmits the generated order to the management apparatus 200. The management apparatus 200 can perform generating of an NS, changing of a configuration of the NS, and deleting of the NS according to the order acquired from the order generation unit 60 (refer to PTL 1).

The maintenance person of the operator terminal 300 can partially select whether a control content of the control by the management apparatus 200 for managing the NS is determined by the operator or the operation apparatus 100. Specifically, the maintenance person of the operator terminal 300 can set, for the operation apparatus 100, whether to operate some or all of the optimal configuration determination unit 31, the quality degradation factor identification unit 32, the fault location estimation unit 33, the abnormality detection unit 34, and the new AI algorithm unit 35 included in the NW-AI unit 30. In a case where at least one of the optimal configuration determination unit 31, the quality degradation factor identification unit 32, the fault location estimation unit 33, the abnormality detection unit 34, or the new AI algorithm unit 35 is operated, a corresponding part of a procedure for determining the control content of the management apparatus 200 is automated.

Processing

Processing executed by the operation apparatus 100 according to the present embodiment will be described. The processing according to the present embodiment is order changing processing that starts in a case where a fault occurs in the NS, for example, in a case of a failure of the server s2 (refer to FIG. 1). Further, the processing according to the present embodiment will be individually described according to a range of the automation of the procedure for determining the control content of the management apparatus 200.

Order Changing Processing in a Case where NS Optimal Configuration Determination is Automated First, order changing processing in a case where NS optimal configuration determination is automated will be described with reference to FIG. 2. In this case, the optimal configuration determination unit 31 is operated, and the control determination unit 10, the NW configuration information updating unit 20, the quality degradation factor identification unit 32, the fault location estimation unit 33, and the abnormality detection unit 34 are stopped. Further, the new AI algorithm unit 35 is not provided in the NW-AI unit 30.

After the operator of the operator terminal 300 recognizes the failure of the server s2 by the alarm information from the NS, the operator performs a distinguishing operation (well-known and a description thereof is omitted) of the server s2 in response to the failure of the server s2. Thereafter, the operator determines an abnormality of the server s2, and causes the operator terminal 300 to generate new configuration information indicating the NW configuration excluding the server s2.

First, the operation apparatus 100 registers the new configuration information acquired from the operator terminal 300, in the NW configuration information management unit 40 (step A1). An entry of the new configuration information is added to the NW configuration information DB 40a. The operator terminal 300 instructs the operation apparatus 100 to start optimal configuration determination of the NS by the optimal configuration determination unit 31.

Next, the operation apparatus 100 acquires a start instruction of the optimal configuration determination of the NS from the operator terminal 300 (step A2). In response to the start instruction, the NW configuration information management unit 40 reads the new configuration information from the NW configuration information DB 40a, and reads, from the NW information accumulation unit 50, the catalog used for construction of the current NS, the record applied to the current NS, and the order in which generating of the current NS (or changing of the configuration of the current NS) is requested, which are included in the NW information of the current NS in which a fault occurs.

Next, the operation apparatus 100 causes the NW configuration information management unit 40 to output the new configuration information, which is read from the NW configuration information DB 40a, and the catalog, the record, and the order, which are read from the NW information accumulation unit 50, to the optimal configuration determination unit 31 (step A3). In output, the NW configuration information management unit 40 may convert the new configuration information, the catalog, the record, and the order into a format required for the optimal configuration determination of the NS.

Next, the operation apparatus 100 causes the optimal configuration determination unit 31 to determine the optimal configuration of the NS based on the new configuration information, the catalog, the record, and the order (step A4). The optimal configuration determination unit 31 outputs the determined optimal configuration of the NS to the order generation unit 60.

Next, the operation apparatus 100 causes the order generation unit 60 to generate a change order for changing the current NS configuration to the optimal NS configuration (step A5). The change order includes the catalog selected to construct the NS with the optimal configuration, the type of the operation request of the lifecycle applied to the NS with the optimal configuration (e.g., generating of the NS, updating of the NS, and deleting of the NS), and the input parameter applied to the NS with the optimal configuration. The selection of the catalog for the change order may be performed by the operator of the operator terminal 300, or may be performed by the order generation unit 60.

Figure 2:
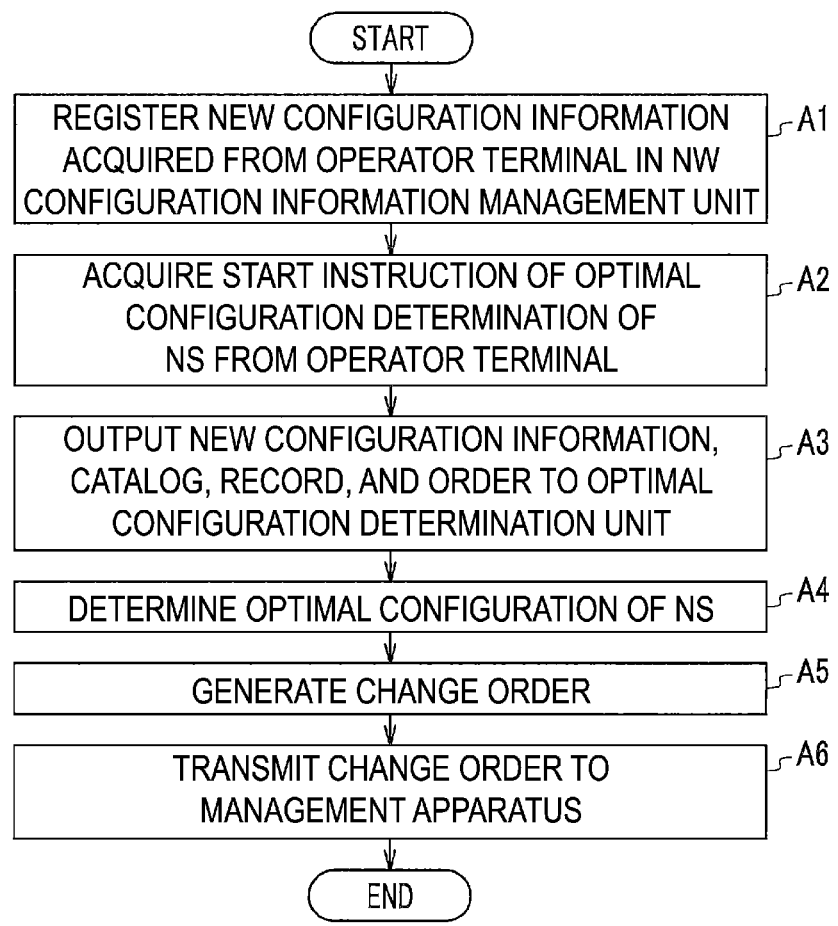
FIG. 2 is a flowchart illustrating order changing processing in a case where NS optimal configuration determination is automated.

Next, the operation apparatus 100 causes the order generation unit 60 to transmit the generated change order to the management apparatus 200 (step A6), and ends the order changing processing in FIG. 2. The management apparatus 200 executes changing of the configuration of the NS based on the received change order, and operates the NS with the changed configuration so as to provide a continuous service.

According to the order changing processing in FIG. 2, the NS optimal configuration determination is automated, and thus a maintenance burden of the operator is reduced. Therefore, a maintenance/operation cost of the network service can be reduced.

Order Changing Processing in a Case where NS Abnormality Detection and NS Optimal Configuration Determination are Automated Next, order changing processing in a case where NS abnormality detection and NS optimal configuration determination are automated will be described with reference to FIG. 3. In this case, the abnormality detection unit 34 and the optimal configuration determination unit 31 are operated, and the control determination unit 10, the NW configuration information updating unit 20, the quality degradation factor identification unit 32, and the fault location estimation unit 33 are stopped. Further, the new AI algorithm unit 35 is not provided in the NW-AI unit 30. In this description, differences from the description of the processing in FIG. 2 will be mainly described.

First, the operation apparatus 100 causes the abnormality detection unit 34 to detect an abnormality related to the failure of the server s2 (step B1). Specifically, the abnormality detection unit 34 detects an abnormality based on the alarm information from the NS and the performance information (memory information, NW-IF information, CPU information, and flow information) related to the NS, which is read from the NW information accumulation unit 50, by deep learning.

Next, the operation apparatus 100 causes the abnormality detection unit 34 to notify the operator terminal 300 of the detected abnormality (step B2). The operator determines the abnormality of the server s2, and causes the operator terminal 300 to generate new configuration information indicating the NW configuration excluding the server s2. Thereafter, the above-described steps A1 to A6 (FIG. 2) are performed, and the order changing processing in FIG. 3 is ended.

Figure 3:
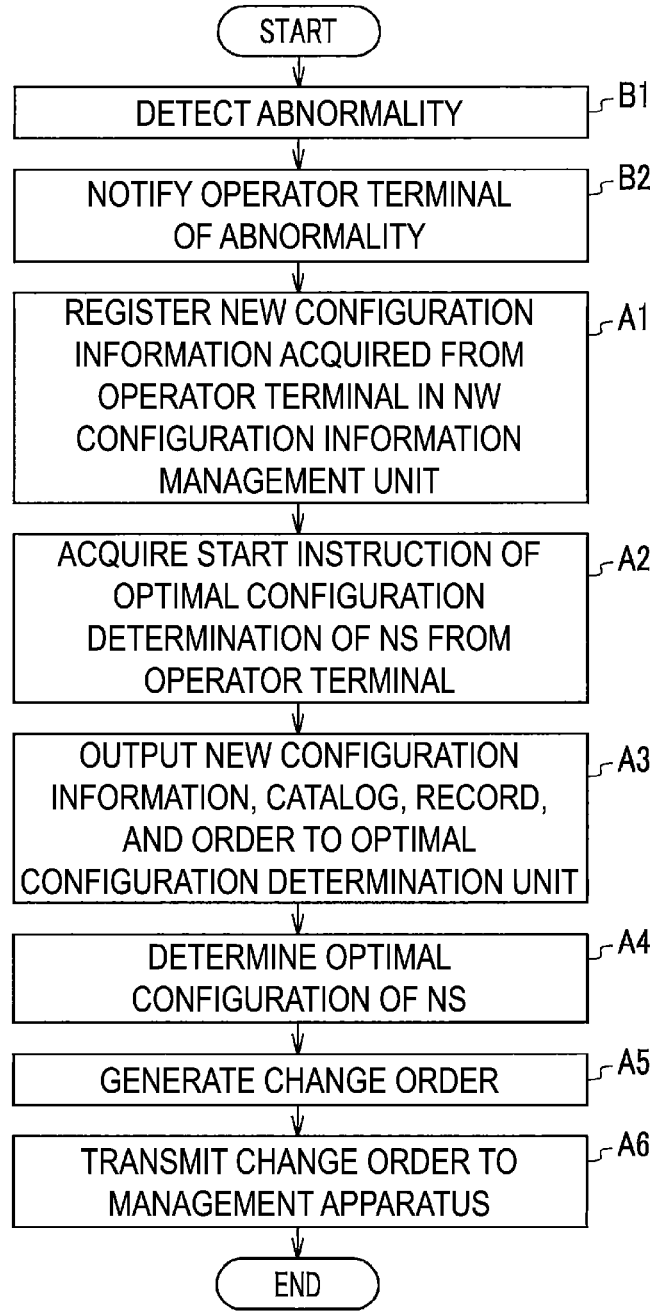
FIG. 3 is a flowchart illustrating order changing processing in a case where NS abnormality detection and NS optimal configuration determination are automated.

According to the order changing processing in FIG. 3, the NS abnormality detection is also automated as compared with the order changing processing in FIG. 2, and thus the maintenance burden of the operator is further reduced. Accordingly, the maintenance/operation cost of the network service can be further reduced.

Order Changing Processing in a Case where NS Abnormality Detection, NW Configuration Information Updating, and NS Optimal Configuration Determination are Automated Next, order changing processing in a case where NS abnormality detection, NW configuration information updating, and NS optimal configuration determination are automated will be described with reference to FIG. 4. In this case, the control determination unit 10, the NW configuration information updating unit 20, the abnormality detection unit 34, and the optimal configuration determination unit 31 are operated, and the quality degradation factor identification unit 32 and the fault location estimation unit 33 are stopped. Further, the new AI algorithm unit 35 is not provided in the NW-AI unit 30. In this description, differences from the descriptions of the processing in FIG. 2 and FIG. 3 will be mainly described.

First, the above-described step B1 (FIG. 3) is performed, and the operation apparatus 100 detects an abnormality related to the failure of the server s2.

Next, the operation apparatus 100 causes the control determination unit 10 to determine control necessity and a control target of a control by the management apparatus 200 in response to the abnormality detection (step C1). In the present processing, it is assumed that the control necessity is determined as being necessary and the control target is the server s2.

Next, the operation apparatus 100 causes the NW configuration information updating unit 20 to generate new configuration information indicating the NW configuration excluding the server s2 (step C2).

Next, the operation apparatus 100 registers the new configuration information generated by the NW configuration information updating unit 20, in the NW configuration information management unit 40 (step C3).

Next, the operation apparatus 100 causes the NW configuration information updating unit 20 to instruct starting of optimal configuration determination of the NS (step C4). Thereafter, the above-described steps A3 to A6 (FIG. 2) are performed, and the order changing processing in FIG. 4 is ended.

Figure 4:
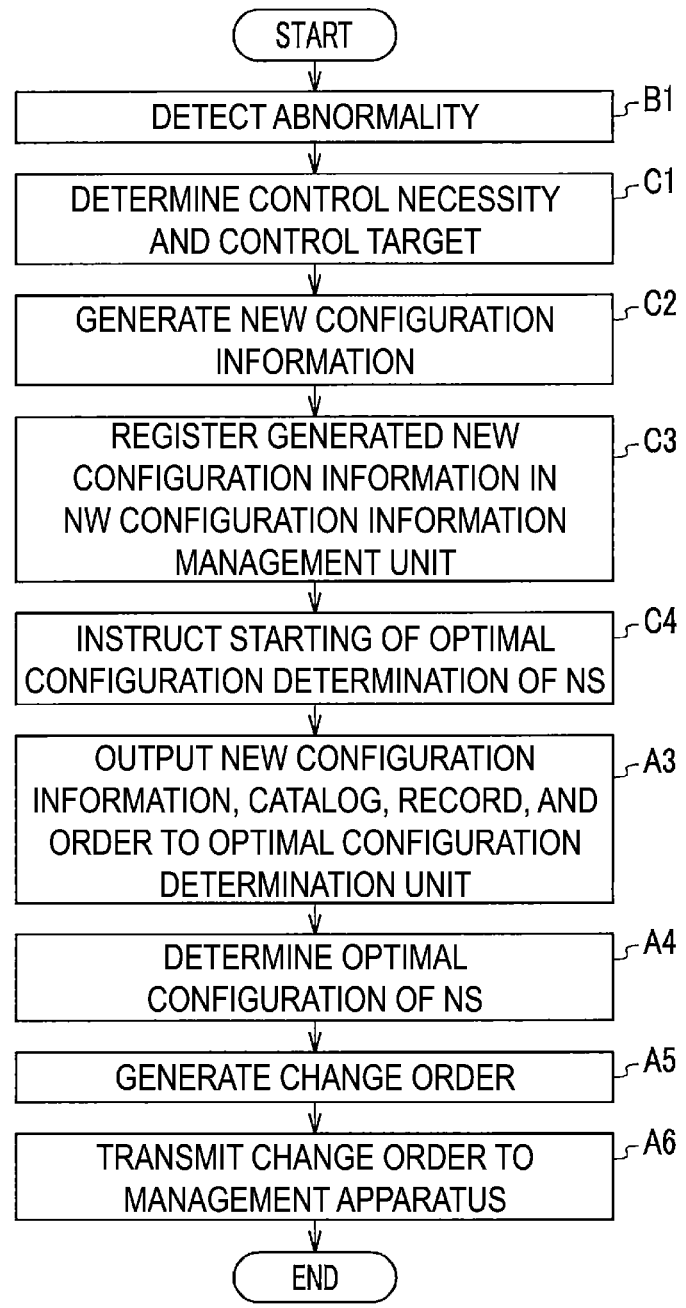
FIG. 4 is a flowchart illustrating order changing processing in a case where NS abnormality detection, NW configuration information updating, and NS optimal configuration determination are automated.

According to the order changing processing in FIG. 4, the NW configuration information updating (new configuration information generation) is also automated as compared with the order changing processing in FIG. 3, and thus the maintenance burden of the operator is further reduced. Accordingly, the maintenance/operation cost of the network service can be further reduced.

Further, the order changing processing in FIG. 4 can be performed without an intervention of the operator, and thus a closed-loop NS control by the management apparatus 200 can be realized.

Figure 5:
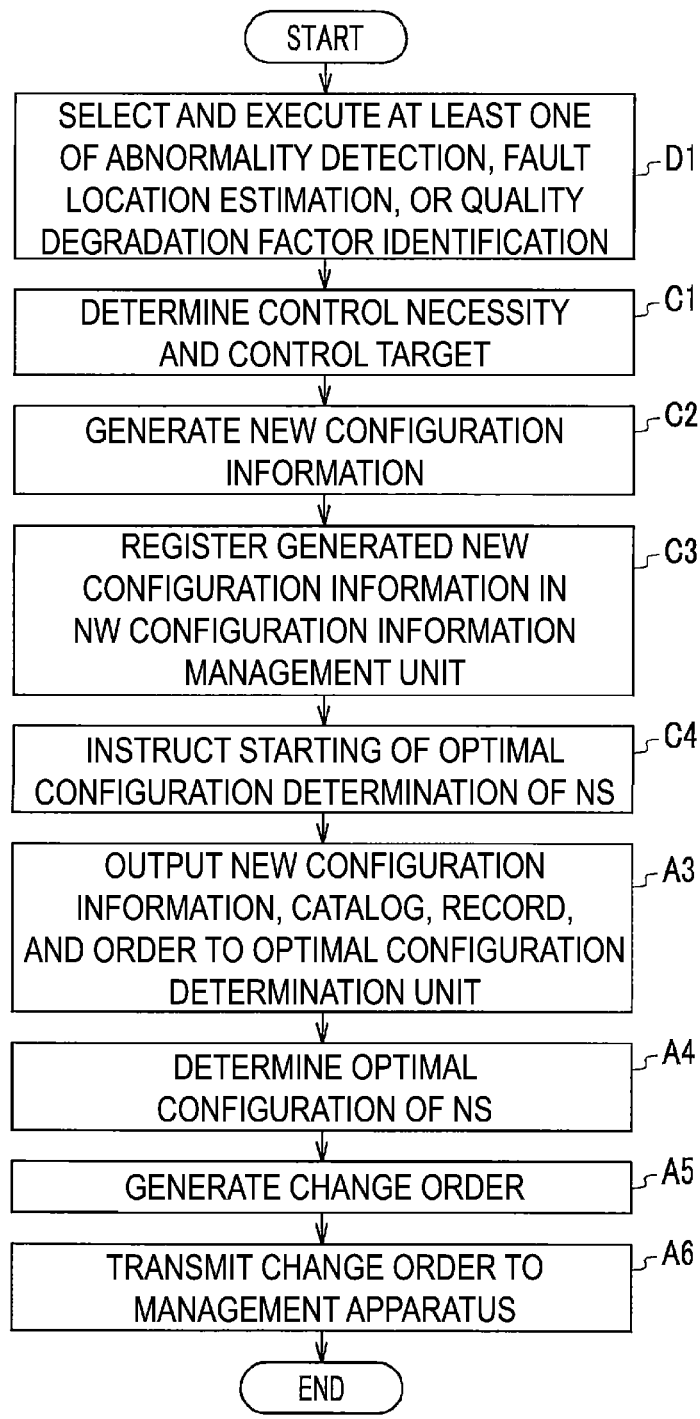
FIG. 5 is a flowchart illustrating order changing processing in a case where NS abnormality detection, fault location identification, quality degradation factor identification, NW configuration information updating, and NS optimal configuration determination are automated.

Order Changing Processing in Case where NS Abnormality Detection, Fault Location Estimation, Quality Degradation Factor Identification, NW Configuration Information Updating, and NS Optimal Configuration Determination are Automated Next, order changing processing in a case where NS abnormality detection, fault location estimation, quality degradation factor identification, NW configuration information updating, and NS optimal configuration determination are automated will be described with reference to FIG. 5. In this case, the control determination unit 10, the NW configuration information updating unit 20, the abnormality detection unit 34, the optimal configuration determination unit 31, the quality degradation factor identification unit 32, and the fault location estimation unit 33 are operated, and the new AI algorithm unit 35 is not provided in the NW-AI unit 30. In this description, differences from the descriptions of the processing in FIG. 2 to FIG. 4 will be mainly described.

First, the operation apparatus 100 selects and performs at least one of abnormality detection (refer to step B1 (FIG. 3)), fault location estimation by the fault location estimation unit 33, or quality degradation factor identification by the quality degradation factor identification unit 32 (step D1). In a case where the abnormality detection is selected, the operation apparatus 100 detects an abnormality related to the failure of the server s2.

In a case where the fault location estimation is selected, the fault location estimation unit 33 estimates a fault location based on the alarm information from the NS and the performance information (memory information, NW-IF information, CPU information, and flow information) related to the NS, which is read from the NW information accumulation unit 50.

In a case where the quality degradation factor identification is selected, the quality degradation factor identification unit 32 identifies a quality degradation factor based on the alarm information from the NS and the performance information (memory information, NW-IF information, CPU information, and flow information) related to the NS, which is read from the NW information accumulation unit 50. Thereafter, the above-described steps C1 to C4 (FIG. 4) and the above-described steps A3 to A6 (FIG. 2) are performed, and the order changing processing in FIG. 5 is ended. In step C2, the new configuration information generated by the NW configuration information updating unit 20 may be new configuration information in which the server s2 with a failure is removed, new configuration information in which the estimated fault location is removed, new configuration information in which the identified quality degradation factor is removed, or new configuration information in which these pieces of the new configuration information are selectively combined.

According to the order changing processing in FIG. 5, the fault location identification and the quality degradation factor identification are also automated as compared with the order changing processing in FIG. 4, and thus the maintenance burden of the operator is further reduced. Accordingly, the maintenance/operation cost of the network service can be further reduced.

Expansion of NW-AI Unit 30

In the operation apparatus 100 according to the present embodiment, by adding the new AI algorithm unit 35 in the NW-AI unit 30, it is possible to expand the algorithm, which is used for the control necessity determination and the control target determination of the control determination unit 10 in addition to the above-described NS abnormality detection, the above-described fault location estimation, and the above-described quality degradation factor identification.

Others (a) The targets to be automated in the order changing processing are not limited to the NS abnormality detection, the fault location estimation, the quality degradation factor identification, the NW configuration information updating, the NS optimal configuration determination, and the function by the new AI algorithm unit 35. In addition, a combination of the targets to be automated in the order changing processing is not limited to the combination described in the present embodiment, and various combinations can be adopted. For example, only NW configuration information updating may be automated. Further, at least any one of the fault location estimation and the quality degradation factor identification may be automated.
(b) In the present embodiment, the abnormality detection unit 34 detects the abnormality by, for example, deep learning. On the other hand, the abnormality detection unit 34 may perform the abnormality detection by a Support Vector Machine (SVM). Further, each function of the control determination unit 10, the NW configuration information updating unit 20, and the NW-AI unit 30 including the optimal configuration determination unit 31, the quality degradation factor identification unit 32, the fault location estimation unit 33, and the new AI algorithm unit 35 may be realized by deep learning, an SVM, or the like.

It is also possible to realize a technique in which various techniques described in the present embodiment are appropriately combined.

The software described in the present embodiment may also be realized as hardware, and the hardware described in the present embodiment may also be realized as software.

In addition, hardware, software, and flowcharts may be changed as appropriate without departing from the spirit of the present disclosure.

The invention claimed is:

1. A method for outputting a request to a management apparatus which manages a Network Service (NS) constructed on a NetWork (NW) including a core NW serving as a virtualization area and an access NW serving as a non-virtualization area, the method comprising:
   detecting, on the NS that is already constructed on the NW, a fault using one or more of deep learning or a support vector machine;
   storing, for the NS that is already constructed on the NW and in a memory, new configuration information obtained by updating NW configuration information indicating an NW configuration including devices disposed on the NW due to the fault of the NS that is already constructed on the NW, a catalog which is a template of the NS that is already constructed on the NW, a record describing a lifecycle of the NS that is already constructed on the NW, and an order for requesting the management apparatus to control the NS that is already constructed on the NW;
   determining, due to the fault and by one or more processors, an optimal configuration of the NS that is already constructed on the NW based on the new configuration information, the catalog, the record, and the order; and
   generating, by the one or more processors, a change order that changes an NS configuration of the NS that is already constructed on the NW to the optimal configuration determined due to the fault on the NS.

2. An operation apparatus, including one or more computing devices, for outputting a request to a management apparatus which manages a Network Service (NS) constructed on a NetWork (NW) including a core NW serving as a virtualization area and an access NW serving as a non-virtualization area, the operation apparatus comprising at least one processor and a memory including instructions that when executed by the at least one processor cause the operation apparatus to be configured to:
   detect, on the NS that is already constructed on the NW, a fault using one or more of deep learning or a support vector machine;
   store, for the NS that is already constructed on the NW, new configuration information obtained by updating NW configuration information indicating an NW configuration including devices disposed on the NW due to the fault of the NS that is already constructed on the NW, a catalog which is a template of the NS that is already constructed on the NW, a record describing a lifecycle of the NS that is already constructed on the NW, and an order for requesting the management apparatus to control the NS that is already constructed on the NW;
   determine, due to the fault, an optimal configuration of the NS that is already constructed on the NW based on the new configuration information, the catalog, the record, and the order; and generate a change order that changes an NS configuration of the NS that is already constructed on the NW to the optimal configuration determined due to the fault on the NS.

3. The operation apparatus according to claim 2, wherein the instructions cause the operation apparatus to be configured to:
store alarm information indicating an occurrence of the fault of the NS and performance information indicating a specification of the devices disposed on the NW, and
detect an abnormality based on the alarm information and the performance information.

4. The operation apparatus according to claim 3, wherein the instructions cause the operation apparatus to be configured to:
determine control necessity and a control target of a control by the management apparatus in response to the abnormality detection; and
update the NW configuration information to the new configuration information.

5. The operation apparatus according to claim 2, wherein the instructions cause the operation apparatus to be configured to:
store alarm information indicating an occurrence of the fault of the NS and performance information indicating a specification of the devices disposed on the NW;
estimate a fault location based on the alarm information and the performance information, and
identify a quality degradation factor based on the alarm information and the performance information.

6. The operation apparatus according to claim 5, wherein the instructions cause the operation apparatus to be configured to: determine control necessity and a control target of a control in response to an estimation of the fault location or identification of the quality degradation factor; and
update the NW configuration information to the new configuration information in which the estimated fault location is removed or the new configuration information in which the identified quality degradation factor is removed.

7. The operation apparatus according to claim 6, wherein a function unit used for determination is provided so as to be addable.

* * * * *